(12) United States Patent
Harada

(10) Patent No.: US 6,563,938 B1
(45) Date of Patent: May 13, 2003

(54) SHEET-THROUGH TYPE DOCUMENT READER

(75) Inventor: Hiroyuki Harada, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/441,746

(22) Filed: Nov. 17, 1999

(30) Foreign Application Priority Data

Dec. 25, 1998 (JP) .......................................... 10-370458

(51) Int. Cl.$^7$ .............................. G06K 9/00; H04N 1/40; H04N 1/04
(52) U.S. Cl. ....................... 382/108; 358/461; 358/486; 382/112
(58) Field of Search ...................... 382/108; 358/461, 358/486

(56) References Cited

U.S. PATENT DOCUMENTS 5,535,023 A * 7/1996 Yamazaki ................. 235/457
6,301,019 B1 * 10/2001 Saito et al. ................ 358/461

FOREIGN PATENT DOCUMENTS

| JP | 62-49773 | | 3/1987 | |
| JP | 05-014616 | * | 1/1993 | ............ H04N/1/04 |
| JP | 6-233062 | | 8/1994 | |
| JP | 7-298007 | | 11/1995 | |
| JP | 2000-50023 | | 2/2000 | |

OTHER PUBLICATIONS

Office Action and its English translation issued on Oct. 10, 2000 for corresponding Japanese Application No. 10-370458.
Office Action and its English translation issued on Aug. 14, 2001 for corresponding Japanese Application No. 10-370458.
Office Action and its English translation issued on Nov. 27, 2001 for corresponding Japanese Application No. 10-370458.

* cited by examiner

*Primary Examiner*—Leo Boudreau
*Assistant Examiner*—Hussein Akhavannik
(74) *Attorney, Agent, or Firm*—Smith, Gambrell & Russell, LLP

(57) ABSTRACT

A sheet-through document reader for reading an image formed on a surface of a document original being transported through a reading position. The document reader includes: a reading mechanism for performing main scanning to scan the surface of the document original in a direction perpendicular to a document transport direction at the reading position thereby to read an optical image of the document original, and converting the optical image into image signals; an abnormal value detection circuit for determining whether or not any abnormal value is present in image signals obtained by performing the main scanning by means of the reading mechanism, for example, before the document is read; and a reading position shifting mechanism for shifting the reading position in the document transport direction when the abnormal value detection circuit detects an abnormal value.

8 Claims, 4 Drawing Sheets

SHEET-THROUGH TYPE DOCUMENT READER

BACKGROUND OF THE INVENTION

1. Field of the Invention

The present invention relates to a sheet-through type document reader for use in an image forming apparatus such as a digital copying machine or a multi-functional apparatus having a copying function and a facsimile function. More particularly, the invention relates to a sheet-through type document reader which is advantageous for preventing occurrence of a black line in a reproduced image which is attributed to dust, dirt, a scratch or the like present on an upper or lower surface of a contact glass.

2. Description of Related Art

Digital image forming apparatuses represented by digital copying machines and multi-functional image forming apparatuses are typically provided with a sheet-through type document reader. The sheet-through type document reader is adapted to read an image of a document original during passage of the document original through a stationary reading section thereof. Where a copy is made from a document original or image data of a document original is taken into a computer by means of such a sheet-through type document reader, it is important to reproduce an original image with a high fidelity.

In reality, however, an abnormal image portion which is different from the corresponding portion of the original image is often observed in a reproduced image (an image of the copy or an image reproduced on the basis of the image data). The abnormal image is produced due to malfunction of a reading system, an image forming system or an image processing system, and a variety of image abnormalities could occur depending on which system malfunctions and what kind of trouble the system suffers from.

Particularly, local image abnormalities are conspicuous and, therefore, consideration should be given to the local image abnormalities. Examples of the local image abnormalities include black spots and black lines formed on a white background portion and omissions such as white spots and white lines formed on a solid image portion. In general, these image abnormalities rarely occur when the sheet-through document reader is brand-new, but progressively occur during prolonged use.

A major cause of the image abnormalities is that dust in air and paper dust from document originals transported through the reader adhere on optical components of a reader optical system and contaminate the optical components. More specifically, contamination of an upper or lower surface of a contact glass or contamination of a mirror, a lens or the like is a common cause.

The problem of the contamination of the optical components can be somewhat alleviated by completely sealing a housing space of the reader optical system. However, a document illumination lamp as a heat source coexists with an image sensor (CCD) for sensing an optical image of a document original, so that cooling means is required for cooling the image sensor which is highly temperature-dependent. Therefore, it is virtually impossible to completely seal the housing space of the reader optical system.

In the sheet-through type document reader, a dust filter is provided in an air inlet of an enclosure for protection against dust. However, the aforesaid image abnormalities may also occur due to minute dust particles having passed through the dust filter and, therefore, cannot completely be prevented by the provision of the dust filter alone.

A current approach to this problem is that a user or a service man takes proper countermeasures when an image abnormality occurs. More specifically, the user cleans the upper surface of the contact glass for decontamination. The service man cleans the lower surface of the contact glass, the mirrors and the lenses for decontamination at maintenance.

However, when an image abnormality occurs, troubleshooting is difficult even for a skilled service man who has enough knowledge about the sheet-through type document reader, and is time-consuming.

In the case of a digital copying machine, for example, which of a printer section, a reading section and an image processing section the cause of an image abnormality resides in should be inferred from the kind of the image abnormality and the like. Even if it has been found that the cause resides in the reading section, it should further be determined which of optical components of the reading section the cause resides in. Thus, the troubleshooting requires a complicated and troublesome operation.

SUMMARY OF THE INVENTION

It is an object of the present invention to provide a sheet-through type document reader which effectively prevents image abnormalities due to the dust or the like presented on a contact glass, thereby making the troubleshooting easier.

In accordance with one aspect of the present invention, there is provided a sheet-through type document reader for reading an image formed on a surface of a document original being transported through a reading position, the document reader comprising: a reading mechanism for performing main scanning to scan the surface of the document original in a direction perpendicular to a document transport direction at the reading position thereby to read an optical image of the document original, and converting the optical image into image signals; an abnormal value detection circuit for determining whether or not any abnormal value is present in image signals obtained by performing the main scanning in predetermined timing by means of the reading mechanism; and a reading position shifting mechanism for shifting the reading position in the document transport direction when the abnormal value detection circuit detects an abnormal value.

The abnormal value detection circuit is preferably adapted to determine whether or not any abnormal value is present in image signals obtained by performing the main scanning by means of the reading mechanism, for example, before the document original to be read reaches the reading position.

In accordance with the present invention, dust, dirt or a scratch present on an upper or lower surface of a contact surface is detected by detecting the abnormal value in the image signals. In response to the detection of the abnormal value, the reading position is shifted in the document transport direction. Thus, occurrence of an image abnormality such as a black line can be prevented. That is, the document reader of the present invention is adapted to detect the dust, dirt or scratch present on the upper or lower surface of the contact glass and perform a document reading operation at a reading position apart from the position where the dust or the like has been detected.

Thus, the image abnormality due to the dust or the like present on the upper or lower surface of the contact glass can be avoided by the automatic shift of the reading position in accordance with the present invention. Therefore, where an image abnormality occurs in a copying machine or the like provided with this document reader, it is merely necessary to check components other than the contact glass, thereby facilitating the troubleshooting.

In accordance with another aspect of the invention, there is provided a document reading process which comprises the steps of: transporting a document original through a reading position; performing a document reading operation by scanning a surface of the document original in a direction perpendicular to a document transport direction at the reading position for main scanning, and converting an optical image of the document original into image signals by means of a reading mechanism; performing an abnormal value detecting operation by determining whether or not any abnormal value is present in image signals obtained by performing the main scanning in predetermined timing by means of the reading mechanism; and shifting the reading position in the document transport direction when an abnormal value is detected in the image signals.

The foregoing and other objects, features and effects of the present invention will become more apparent from the following description of the preferred embodiments with reference to the attached drawings.

DESCRIPTION OF THE PREFERRED EMBODIMENTS

Figure 1:
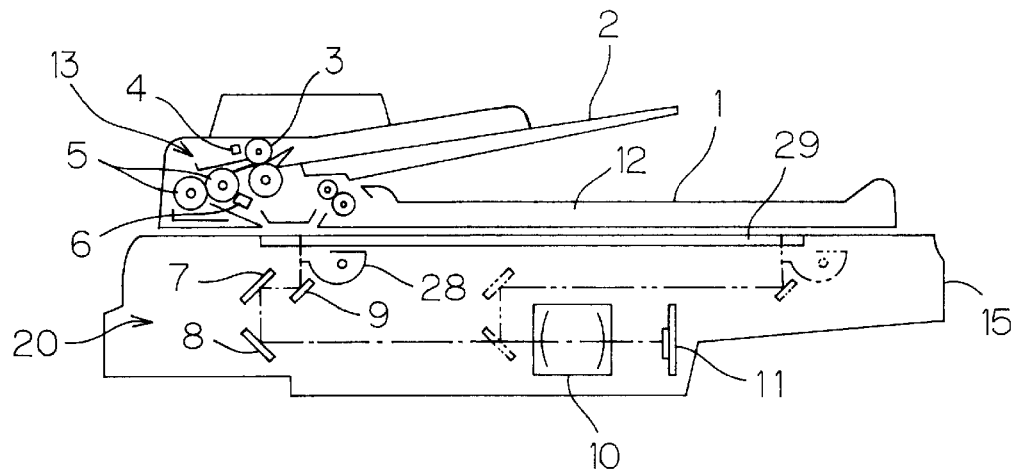
FIG. 1 is a schematic sectional view illustrating the construction of a sheet-through type document reader according to one embodiment of the present invention.

FIG. 1 is a schematic sectional view illustrating a sheet-through type document reader to be used as a document reading section for an image forming apparatus such as a digital copying machine or a multi-functional apparatus. The document reader includes a scanner section 20 accommodated in a housing 15 having a contact glass 29 on its top surface, and a document feeder 1 attached on the top of the scanner section 20 in an openable manner. The document feeder 1 of the document reader is openable so that a user can place a document original on the contact glass 29 for document reading. With the document feeder 1 being closed, a document original is automatically fed onto the contact glass 29 by the document feeder 1, so that the document reading can be performed during transportation of the document original.

The document feeder 1 includes a document table 2 for holding thereon document originals to be read, and a document transport mechanism 13 for taking the document originals one by one out of the document table 2, then feeding a document original onto the contact glass 29 and discharging the document original onto a discharge tray 12. The document transport mechanism 13 includes a feed roller 3 for taking a document original out of the document table 2, registration rollers 5 for registering a leading edge of the document original in cooperation with a registration switch 4, and a timing switch 6 for sensing a time point at which the leading edge of the document original passes therethrough.

Figure 2:
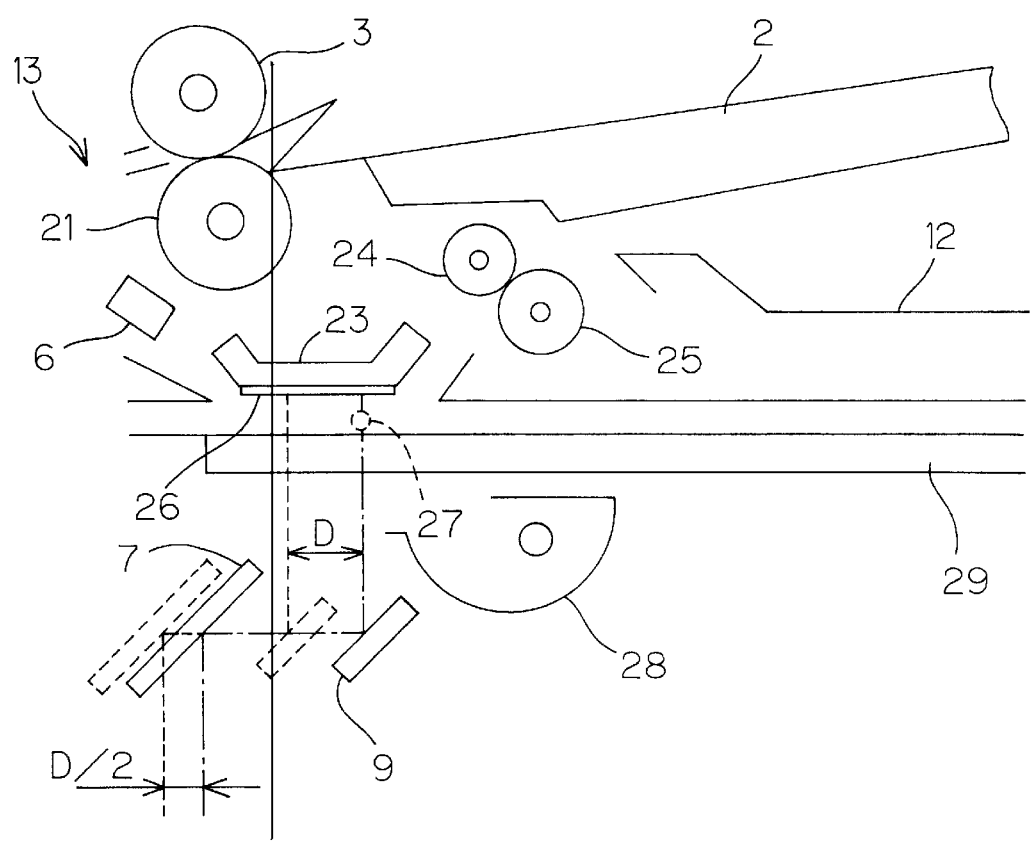
FIG. 2 is a schematic enlarged sectional view illustrating part of the document reader of FIG. 1.

More specifically, the document transport mechanism 13 has a document presenting member 23 provided downstream of the timing switch 6 with respect to the document transport direction as facing toward one edge of an upper surface of the contact glass 29, as shown in FIG. 2. A pair of discharge rollers 24, 25 for transporting the document original toward the discharge tray 12 are provided downstream of the document presenting member 23 with respect to the document transport direction.

The document originals on the document table 2 are taken out on a one-by-one basis by operation of the feed roller 3 and a separation roll 21 pressed against the feed roller, and each pass sequentially through the registration switch 4, the registration rollers 5 and the timing switch 6 thereby to be transported to the document presenting member 23. The document original, after having been presented on the contact glass 29 below the document presenting member 23, is discharged into the discharge tray 12 by the pair of discharge rollers 24, 25. That is, the document original is transported through a gap defined between the document presenting member 23 and the contact glass 29, and image reading of the document original is performed during the transportation of the document original.

A white sheet 26 is provided on a lower surface of the document presenting member 23, i.e., a surface thereof facing toward the contact glass 29. Thus, a white solid image is detected when no document original is present on the contact glass.

The scanner section 20 as a reading mechanism includes a document illumination lamp 28, a CCD image sensor 11 for generating electric signals (image signals) indicative of an optical image of the document original by sensing light reflected from the document original, first, second and third reflection mirrors 9, 7, 8 for guiding the light reflected from the document original toward the CCD image sensor 11, and a lens system 10 for focusing the optical image of the document original on a detection surface of the CCD image sensor 11. The CCD image sensor 11 electrically scans its detection surface. Thus, main scanning is performed in a direction perpendicular to the document transport direction (sub-scanning direction) below the document presenting member 23.

The lamp 28 and the first to third reflection mirrors 9, 7, 8 are movable laterally as seen in FIG. 1 along a lower surface of the contact glass 29. More specifically, the lamp 28 and the first reflection mirror 9 are mounted on a first movable frame (not shown), and the second and third reflection mirrors 7, 8 are mounted on a second movable frame (not shown) which is moved at a speed one-half the speed of the first movable frame.

Where a document original is placed on the contact glass 29 for the image reading thereof, the first and second movable frames are moved so that the lamp 28 scans the document original from one edge to the other edge thereof. Thus, sub-scanning of the document original is achieved.

In the case of a sheet-through reading operation in which a document original is read while being automatically transported by the document feeder 1, the first and second movable frames are kept stationary with the lamp 28 being positioned below the document presenting member 23. In this case, the sub-scanning is achieved by transporting the document original through the gap between the document presenting member 23 and the contact glass 29.

One characteristic feature of this embodiment is that a reading position to be employed for the sheet-through reading operation can be shifted within the range of the width (with respect to the document transport direction) of the white sheet 26 provided on the surface of the document presenting member 23. In the case of a conventional document reader, the reading position for the sheet-through reading is fixed, for example, at a widthwise middle position of the white sheet 26. In this embodiment, on the other hand, the first and second movable frames can finely be adjusted to shift the reading position for the sheet-through reading in the document transport direction.

Figure 3:
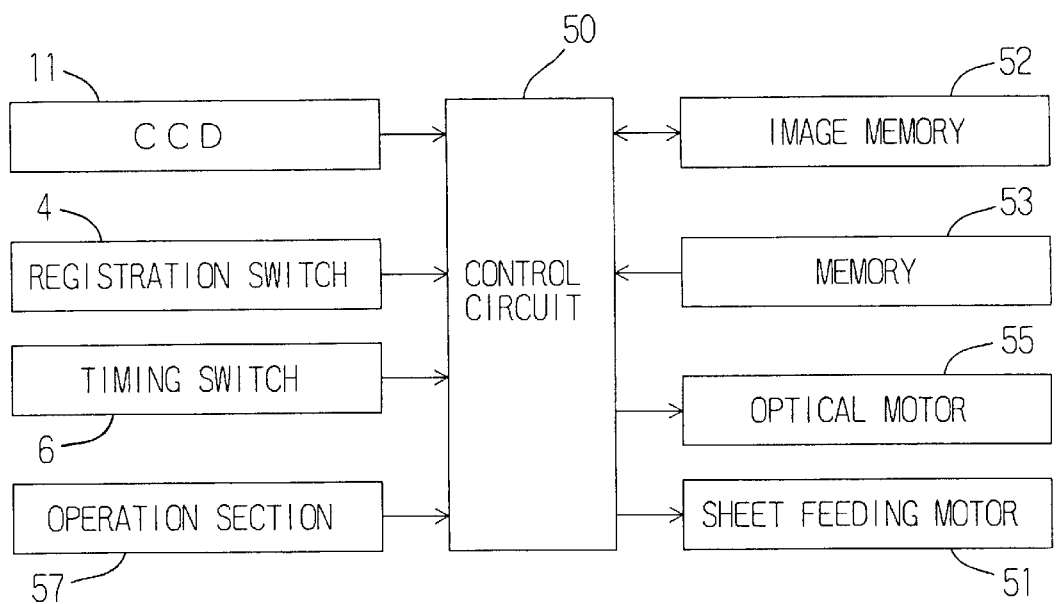
FIG. 3 is a block diagram illustrating an electrical construction for document reading.

FIG. 3 is a block diagram schematically illustrating an electrical construction for the document reading with the use of the document feeder 1. A control circuit 50 including a microprocessor and the like receives detection signals inputted from the registration switch 4 and the timing switch 6. The control circuit 50 controls a sheet feeding motor 51 as a driver of the document transport mechanism 13 on the basis of the detection signals. The control circuit 50 further receives image signals inputted from the CCD image sensor 11, and the image signals are stored in an image memory 52. The control circuit 50 also controls the driving of an optical motor 55 for driving the first and second movable frames. Further, the control circuit 50 is connected to a memory 53 in which table data for the shifting of the reading position is stored. The control circuit 50 further receives signals inputted from an operation section 57 having a start button for starting the document reading and various setting buttons.

The memory 53 may be incorporated in the document reader, but a memory provided, for example, in an image forming section (not shown) of a digital copying machine may be used as the memory 53 and externally connected to the control circuit 50.

The control circuit 50 and the image memory 52 may be incorporated in a main body of the image forming apparatus, and the registration switch 4, the timing switch 6 and the operation section 57 may be connected to the control circuit 50 via proper interconnections.

Where dust 27 or the like (see FIG. 2) is present at a predetermined reading position on the contact glass, the document reader of this embodiment detects the dust or the like as an abnormal value (indicative of an image abnormality) in the image signals. When the abnormal value is detected, the reading position is shifted by a predetermined distance D along the document transport direction. Then, the document reading is performed at the new reading position until an abnormal value is detected at the new reading position.

Figure 4:
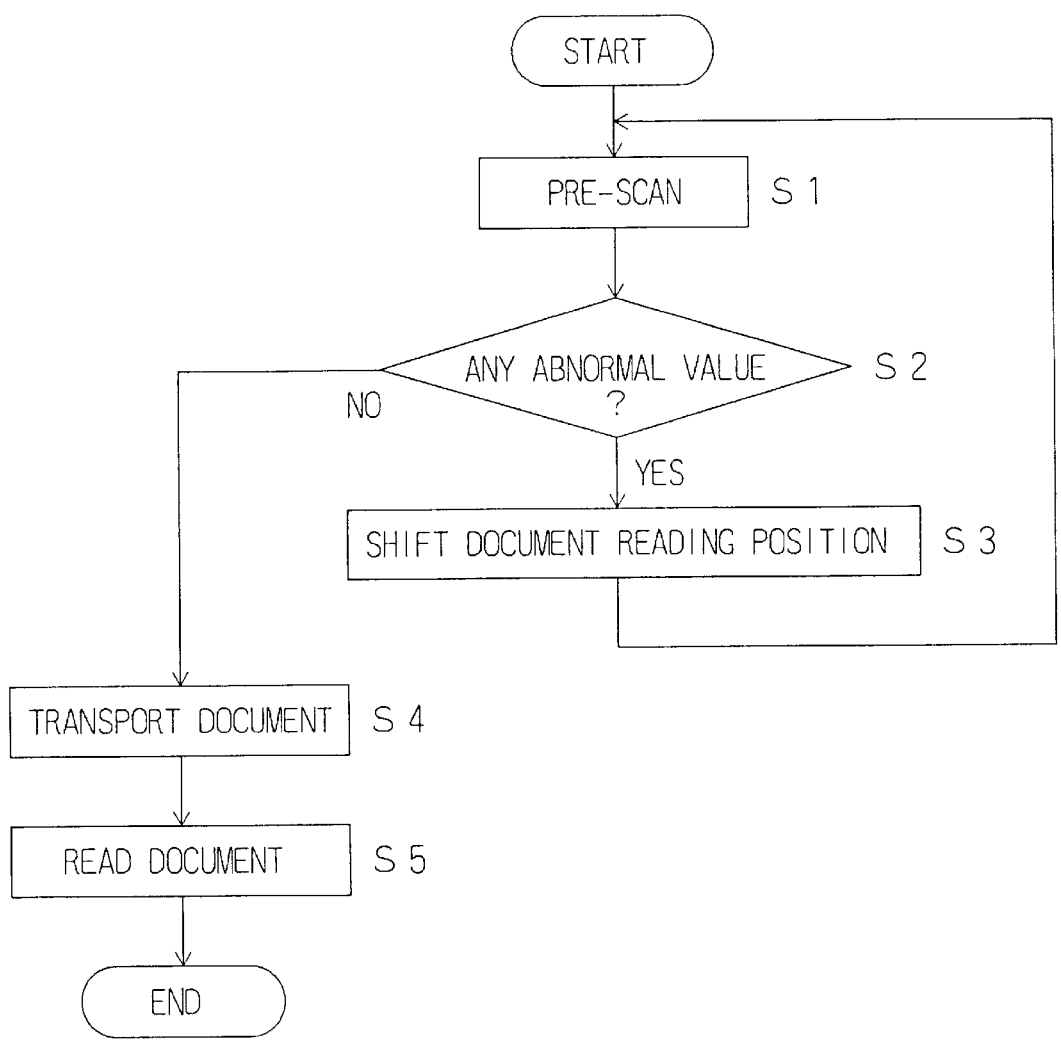
FIG. 4 is a flow chart for explaining a document reading operation.

FIG. 4 is a flow chart for explaining the sheet-through reading operation. When the start button of the operation section 57 is operated, a pre-scanning operation is performed for detection of dust or the like at the reading position (Step S1). The pre-scanning operation is performed before a leading edge of a document original is introduced into the gap between the white sheet 26 and the contact glass 29. Therefore, the CCD image sensor 11 senses light reflected on the white sheet 26, and performs the main scanning at the reading position. Image signals obtained through this operation are stored in the image memory 52 under the control of the control circuit 50.

Figure 5A:
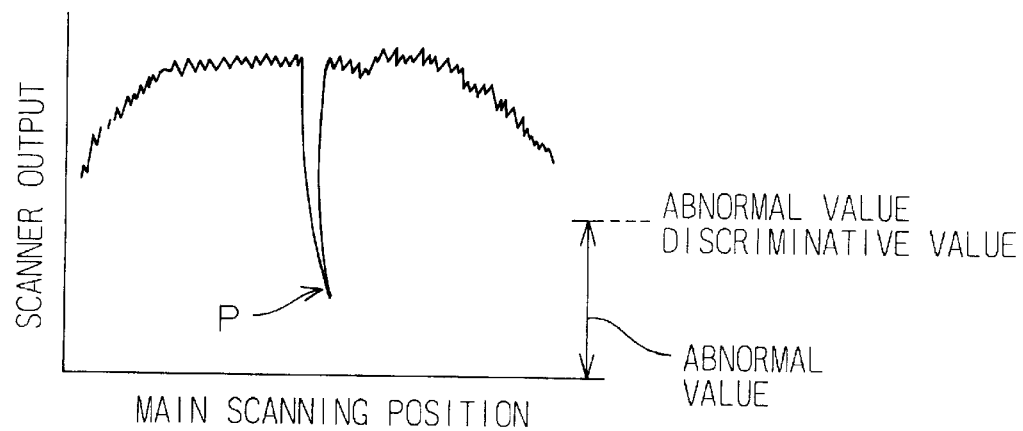
FIGS. 5A and 5B are diagrams showing exemplary image signals obtained at a pre-scanning operation.

The control circuit 50 analyzes the image signals obtained through the pre-scanning operation, and determines whether or not an abnormal value indicative of the presence of the dust or the like is contained in the image signals (Step S2). Where the dust 27 or the like is present at the reading position as shown in FIG. 2, for example, image signals as shown in FIG. 5A are obtained. In this case, a peak indicated by a reference character P has an abnormal value indicative of the dust 27 or the like. The presence of the abnormal value is determined by judging whether or not an image signal corresponding to each pixel of the CCD image sensor 11 is smaller than a predetermined abnormality discriminative value.

If the abnormal value is detected (YES in Step S2), the reading position is shifted by the predetermined distance D in the document transport direction (Step S3). In this embodiment, the reading position is initially set adjacent a downstream edge of the white sheet 26 with respect to the document transport direction at the shipping of the product. Whenever an abnormality is detected in the pre-scanning operation, the reading position is shifted upstream in the document transport direction by the distance D.

The shift of the reading position is achieved by driving the optical motor 55 under the control of the control circuit 50. More specifically, the first movable frame carrying the lamp 28 is moved upstream in the document transport direction by the distance D and the second movable frame carrying the second and third reflection mirrors 7, 8 is moved in the same direction by a distance D/2 by driving the optical motor 55 (see FIG. 2).

After the reading position is shifted (Step S3), the pre-scanning operation (Step S1) and the abnormal value detecting operation (Step S2) are performed again. That is, Steps S1 and S2 are repeated until no abnormal value is detected in the pre-scanning operation.

Figure 5B:
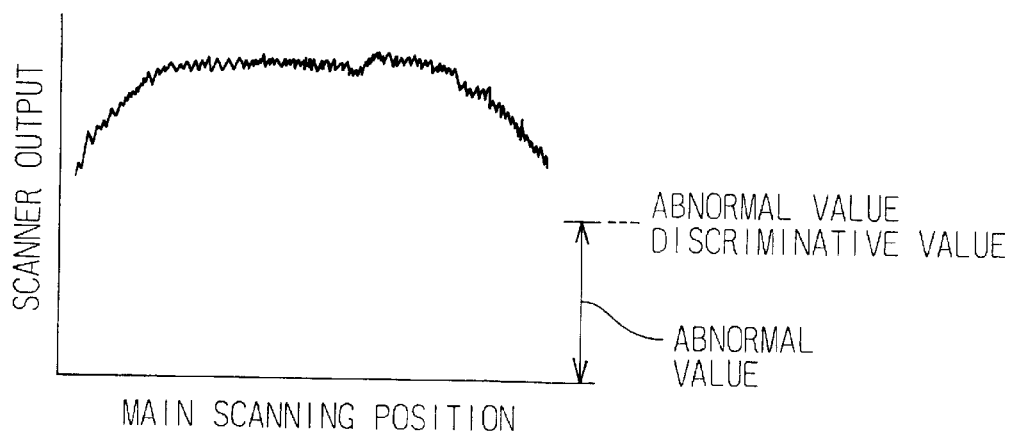

Image signals including no abnormal value are shown in FIG. 5B. In this case, no signal which has a value smaller than the abnormality discriminative value is present in the image signals.

If no abnormal value is detected in the pre-scanning operation (NO in Step S2), the control circuit 50 controls the sheet feeding motor 51 to transport the document original to the document presenting member 23 (Step S4). Upon a leading edge of a document image reaching the reading position, the control circuit 50 starts taking image signals outputted from the CCD image sensor 11, and stores the image signals in the image memory 52 (Step S5).

When the reading position is to be shifted, the control circuit 50 refers the table data in the memory 53. An example of the table data is shown in Table 1.

TABLE 1

| Shift distance (mm) | Number of step counts by which scanning section is to be moved | Number of step counts by which start of image reading is to be advanced |
| --- | --- | --- |
| 0.000 | 0 | 0 |
| 1.016 | 24 | 16 |
| 2.032 | 48 | 32 |
| 3.048 | 72 | 48 |
| 4.064 | 96 | 64 |
| 5.080 | 120 | 80 |
| 6.096 | 144 | 96 |
| 7.112 | 168 | 112 |

It is herein assumed that the step resolution of the scanner section is 600 dpi and the step resolution of the document feeder is 400 dpi.
Per-pulse resolution for scanner section:
25.4/600=0.04233(mm)
Per-pulse resolution for document feeder:
25.4/400=0.63500(mm)
More specifically, the data table defines the number of step counts by which the optical system of the scanner section 20 is to be moved and the number of step counts by which the start of the image reading is advanced, with respect to the shift distance by which the reading position is to be shifted from the initial reading position.

In this case, the predetermined distance D is 1.016 mm. More specifically, when an abnormal value is first detected, the reading position is shifted by 1.016 mm from the initial reading position. When another abnormal value is detected at the new reading position after the shift, the reading position is further shifted by 1.016 mm. At this time, the reading position is apart from the initial reading position by a distance of 2.032 (=1.016×2) mm.

Where the step resolution of the scanner section 20 is 600 dpi, one driving pulse applied to the optical motor 55 causes the lamp 28 to move by a distance of 0.04233 (=25.4/600) mm, so that the reading position is shifted by that distance. To shift the reading position by 1.016 mm, 24 (=1.016/0.04233) driving pulses are applied to the optical motor 55. Therefore, the optical motor 55 is driven by 24 step counts to shift the reading position by the distance D from the initial reading position. The numbers of step counts for other distances of the shift of the optical system have preliminarily been calculated in the same manner, and the step count values thus calculated are stored in the form of table data in the memory 53.

On the other hand, the start of the image reading should be advanced in accordance with the shift distance by which the reading position is shifted upstream in the document transport direction. It is herein assumed, for example, that the step resolution of the document feeder 1 for the document transportation is 400 dpi. By applying one driving pulse to the sheet feeding motor 51, the document original is shifted by a distance of 0.06350 (=25.4/400) mm. Therefore, 16 (=1.016/0.06350) driving pulses should be applied to the sheet feeding motor 51 in order to move the document original by 1.016 mm. Where the reading position is shifted upstream in the document transport direction by 1.016 mm, the start of the document reading is advanced by 16 step counts. The numbers of step counts by which the start of the document reading is advanced for the other shift distances have preliminarily been calculated in the same manner, and the step count values thus calculated are stored in the form of table data in the memory 53.

Needless to say, the step count numbers stored in the form of table data depend on the step resolution of the scanner section 20 and the step resolution of the document feeder 1 and, therefore, the step count numbers shown in Table 1 are merely illustrative which have been calculated on the basis of the aforesaid step resolutions.

During prolonged use of the document reader, the upper or lower surface of the contact glass 29 often suffers from a defect such as adhesion of dust or dirt or formation of a scratch. Such a defect occurring at the reading position prevents exact document reading, so that a black line occurs in a reproduced image (or a white line occurs in a solid image portion) as extending parallel to the sub-scanning direction. Such a problem is solved by this embodiment. In this embodiment, more specifically, the aforesaid defect is detected by detecting an abnormal value in image signals obtained through the pre-scanning operation. If the defect is detected, the reading position is automatically shifted so that the reading position at which the main scanning is performed is set at a position where no defect is present. Thus, an image free from an image defect such as a black line can be reproduced.

Even if an abnormal image is reproduced, the abnormal image is possibly attributed to components other than the contact glass 29, so that troubleshooting is easier.

The inventors conducted an experiment by using a white sheet having a width of about 1 cm as measured in the document transport direction as the white sheet 26. Where a foreign matter having a size greater than the size (about 40 mm) of one pixel of the CCD image sensor 11 was present at the reading position, a black line occurred in a reproduced image. However, after the reading position was shifted to a position within the width of the white sheet 26, an image free from a black line was reproduced.

Although data is preliminarily stored in correspondence with each shift distance of the reading position in the memory in the aforesaid embodiment, the shift distance may be calculated from an algebraic expression as required, or the reading position may be selected from pre-defined reading positions at random. However, it is preferred, for simplification of the control process, to store data in correspondence with pre-defined shift distances in the form of table data in the memory.

The reading position may be reset to the initial reading position at the switch-on of the image forming apparatus. Alternatively, a reading position at the switch-off of the image forming apparatus may be stored in a nonvolatile memory, so that the reading position can be employed at the next switch-on of the apparatus.

Further, where the reading position reaches an upstream edge of the white sheet with respect to the document transport direction as the result of successive shift of the reading position, the reading position may be reset to the initial reading position when an abnormal value is next detected.

Where detection of an abnormal value occurs at all the pre-defined reading positions (eight positions in the case shown in Table 1) in the pre-scanning operation, a message may be displayed on a display device to prompt a user to clean the contact glass.

Although an explanation has been given to a case where the reading position is shifted upstream with respect to the document transport direction in the aforesaid embodiment, the reading position may be shifted downstream with respect to the document transport direction. In response to detection of an abnormal value, the reading position may be selected from the pre-defined reading positions in a given order.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application claims priority benefits under 35 USC Section 119 on the basis of Japanese Patent Application No. 10-370458 filed to the Japanese Patent Office on Dec. 25, 1998, the disclosure thereof being incorporated herein by reference.

What is claimed is:

1. A sheet-through type document reader for reading an image formed on a surface of a document original being transported through a reading position, the document reader comprising:

a reading mechanism for performing main scanning to scan the surface of the document original in a direction perpendicular to a document transport direction at the reading position thereby to read an optical image of the document original, and converting the optical image into image signals;

an abnormal value detection circuit for performing an abnormal value detecting operation by determining whether or not any abnormal value is present in image signals obtained by performing the main scanning in predetermined timing by means of the reading mechanism; and a reading position shifting mechanism for performing a reading position shifting operation by shifting the reading position in the document transport direction when the abnormal value detection circuit detects an abnormal value, wherein the reading position shifting mechanism includes a circuit for setting a new reading position on the basis of table data stored in a memory, and the reading position is not shifted unless the abnormal value detection circuit detects an abnormal value, and the reading mechanism reads the optical image of the documents original at the reading position while the document original is conveyed through the reading position.

2. A document reader as set forth in claim 1, wherein the abnormal value detection circuit determines whether or not any abnormal value is present in image signals obtained by performing the main scanning by means of the reading mechanism before the document original to be read reaches the reading position.

3. A document reader as set forth in claim 1, wherein the abnormal value detection circuit and the reading position shifting mechanism repeatedly perform the abnormal value detecting operation and the reading position shifting operation until no abnormal value is detected by the abnormal value detection circuit.

4. A document reader as set forth in claim 1, wherein the circuit of the reading position shifting mechanism is provided in the document reader or externally connected to the document reader.

5. A document reader as set forth in claim 2, further comprising a document transport mechanism for transporting the document original through the reading position on condition that the abnormal value detection circuit detects no abnormal value.

6. A document reading process comprising the steps of:

transporting a document original through a reading position;

performing a document reading operation by scanning a surface of the document original in a direction perpendicular to a document transport direction at the reading position for main scanning, and converting an optical image of the document original in to image signals by means of a reading mechanism;

performing an abnormal value detecting operation by determining whether or not any abnormal value is present in image signals obtained by performing the main scanning in predetermined timing by means of the reading mechanism; and shifting the reading position in the document transport direction when an abnormal value is detected in the image signal, wherein the reading position is not shifted unless the abnormal value detection circuit detects an abnormal value, and the reading mechanism reads the optical image of the documents original at the reading position while the document original is conveyed through the reading position.

7. A process as set forth in claim 6, wherein the abnormal value detecting step and the reading position shifting step precede the document reading step.

8. A process as set forth in claim 6, wherein the abnormal value detecting step and the reading position shifting step are repeatedly performed until no abnormal value is detected in image signals.

* * * * *